United States Patent
Janssen et al.

(10) Patent No.: US 8,034,243 B2
(45) Date of Patent: Oct. 11, 2011

(54) DENITRIFICATION PROCESS

(75) Inventors: Dominic Janssen, North Lauderdale, FL (US); Michael McGehee, Pompano Beach, FL (US)

(73) Assignee: Parkson Corporation, Fort Lauderdale, FL (US)

( * ) Notice: Subject to any disclaimer, the term of this patent is extended or adjusted under 35 U.S.C. 154(b) by 0 days.

(21) Appl. No.: 12/818,594

(22) Filed: Jun. 18, 2010

(65) Prior Publication Data

US 2010/0252499 A1 Oct. 7, 2010

Related U.S. Application Data

(60) Division of application No. 12/694,768, filed on Jan. 27, 2010, which is a continuation of application No. 12/246,169, filed on Oct. 6, 2008, now Pat. No. 7,662,287, which is a division of application No. 11/504,101, filed on Aug. 15, 2006, now Pat. No. 7,431,840.

(60) Provisional application No. 60/710,612, filed on Aug. 24, 2005.

(51) Int. Cl.
*C02F 3/00* (2006.01)

(52) U.S. Cl. ...................................................... 210/610

(58) Field of Classification Search .................. 210/610, 210/739
See application file for complete search history.

(56) References Cited

U.S. PATENT DOCUMENTS

| 4,681,687 | A |   | 7/1987  | Mouche et al. |       |
|-----------|---|---|---------|---------------|-------|
| 5,556,536 | A |   | 9/1996  | Turk          |       |
| 6,129,104 | A | * | 10/2000 | Ellard et al. | 137/3 |
| 6,319,407 | B1 |   | 11/2001 | Maatta et al. |       |
| 6,632,365 | B1 | * | 10/2003 | Payraudeau et al. | 210/617 |
| 7,153,429 | B1 | * | 12/2006 | Pedros         | 210/610 |
| 7,431,839 | B2 | * | 10/2008 | Morris et al.  | 210/605 |
| 2003/0142301 | A1 | * | 7/2003 | Coleman et al. | 356/301 |
| 2004/0173525 | A1 |   | 9/2004 | Hunniford et al. | |
| 2005/0023224 | A1 | * | 2/2005 | Schmitz et al. | 210/739 |
| 2007/0144966 | A1 |   | 6/2007 | Janssen et al. | |

FOREIGN PATENT DOCUMENTS

| JP | 11-333494   | 12/1999 |
| JP | 2001-170685 | 6/2001  |
| JP | 2002-192164 | 7/2002  |
| JP | 2003-071492 | 3/2003  |

(Continued)

OTHER PUBLICATIONS

Puznava et al., "Classical Feedback/Feedforward Control Applied to Methanol Dosing for Post-Denitrification," Anjou Recherche.*

(Continued)

*Primary Examiner* — Chester Barry
(74) *Attorney, Agent, or Firm* — Gilberto W. Villacorta; Matthew J. Kremer; Foley & Lardner LLP

(57) ABSTRACT

The disclosed process and system are used for the denitrification of wastewater. The system comprises: an influent concentration analyzer for measuring an influent dissolved oxygen concentration, an influent nitrate concentration, and an influent nitrite concentration; and a feed chemical controller for providing a feed chemical at a controlled rate. The feed chemical controller is responsive to one or more output signals provided by an automated control loop that accepts input signals from the influent concentration analyzer, which input signals relate to at least two of the influent nitrate concentration, the influent nitrite concentration, and the influent dissolved oxygen concentration.

22 Claims, 3 Drawing Sheets

FOREIGN PATENT DOCUMENTS

| JP | 2003-266096 | 9/2003 |
|----|-------------|--------|
| JP | 2005-193158 | 7/2005 |
| JP | 2006-204967 | 8/2006 |

OTHER PUBLICATIONS

Beemster, et al. "On-Line Analysis of Nitrate and Nitrite in Wastewater without the use of Reagents through Multiple Wavelength Absorbance Spectroscopy,"http://web.archive.org/web/20040822161613/http:l/www.chemscan.com/technicallpdf/asa-63.pdf, posted to web Aug. 22,2004,downloaded Jun. 19, 2010.

CN Office Action in CN Appln No: 200680030948.5 dated May 12, 2010.

US Office Action in U.S. Appl. No. 12/694,768 dated Jun. 25, 2010.

Freed et al., "Enhanced Nutrient Removal Using a Continuous Backwash Filter for Secondary Effluent Denitrification," USFilter Davco Products.

Hultman et al., "Combined Nitrogen and Phosphorus Removal in a Full-Scale Continuous Up-Flow Sand Filter," *Water Science & Technology*, 1994, pp. 127-134, vol. 29, No. 10-11, Great Britain.

Lindberg et al., "Adaptive Control of External Carbon Flow Rate in an Activated Sludge Process," *Water Science & Technology*, 1996, pp. 173-180, vol. 34, No. 3-4, Great Britain.

U.S. Appl. No. 12/694,768, filed Jan. 27, 2010, Janssen, Dominic.

Office Action mailed Oct. 5, 2010 in Japan Application No. 2008-528022, with translation.

Office Action mailed Dec. 8, 2010 in U.S. Appl. No. 12/694,768.

* cited by examiner

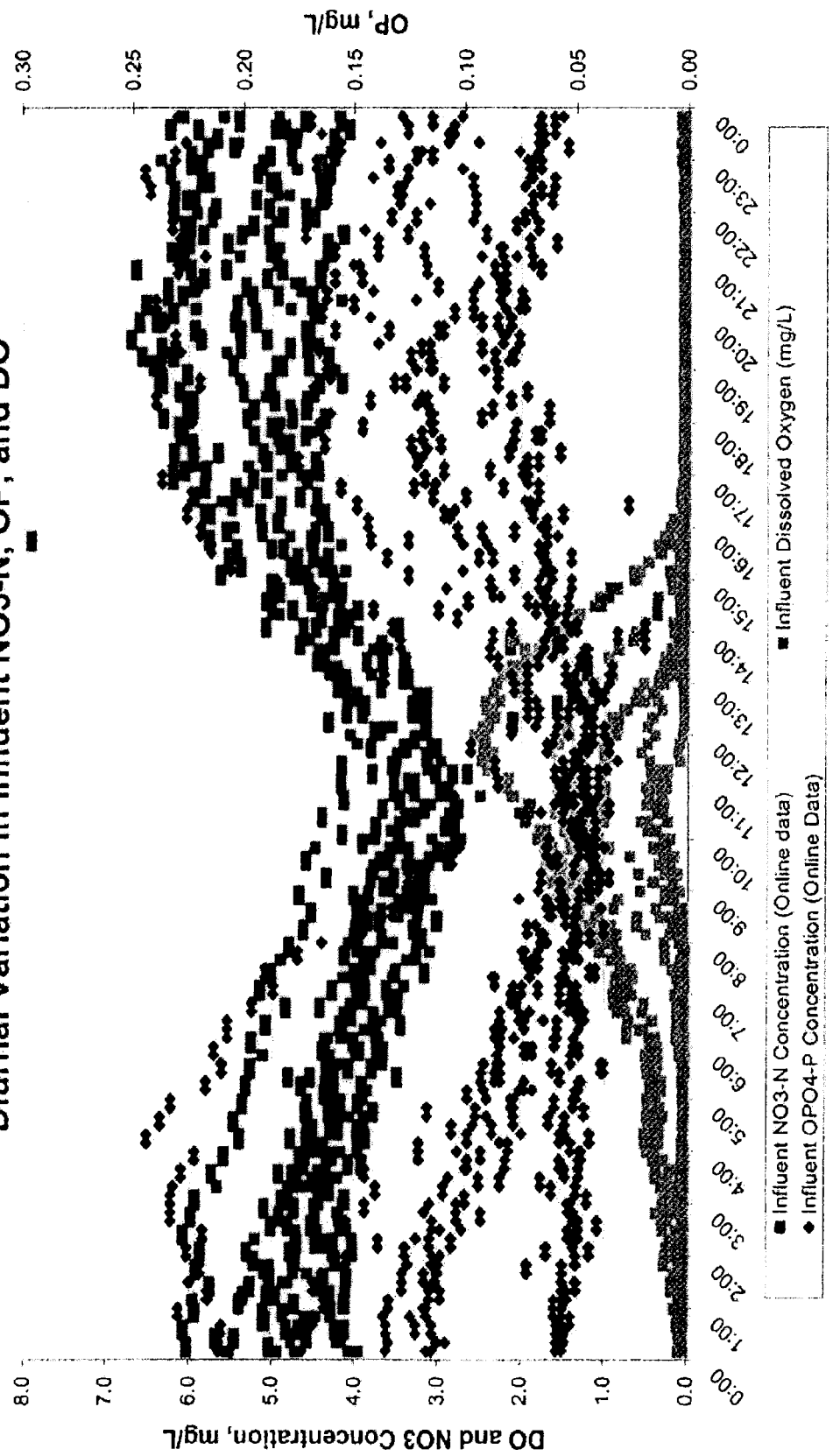

DENITRIFICATION PROCESS

CROSS-REFERENCE TO RELATED PATENT APPLICATIONS

The present application is a Divisional of U.S. application Ser. No. 12/694,768, filed Jan. 27, 2010, now allowed, which is a Continuation of U.S. application Ser. No. 12/246,169, filed Oct. 6, 2008 (now U.S. Pat. No. 7,662,287), which is a Divisional of U.S. application Ser. No. 11/504,101, filed Aug. 15, 2006 (now U.S. Pat. No. 7,431,840), which claims priority to U.S. Provisional Application No. 60/710,612, filed Aug. 24, 2005, the disclosures of which are incorporated by reference herein in their entireties.

BACKGROUND OF THE INVENTION

1. Field of the Invention

The present invention relates generally to a system and process for wastewater treatment and, in particular, to a system and process for denitrification of wastewater.

2. Related Art

According to a recent article, which appeared in the Washington Post ("Troubled Waters in the Shenandoah: Death of Smallmouth Bass Brings Attention But No Quick Answers on Improving Quality" By Michael Alison Chandler, Washington Post Staff Writer, Wednesday, Jul. 20, 2005; Page B01), questions are constantly being raised about the quality of the water that feeds into waterways in and around the Shenandoah Valley and, ultimately, the Chesapeake Bay. Among the factors cited in the article, the high nutrient (and nitrogen) content in the feed waters was noted as a significant culprit:

The river is also known to have high nutrient levels. Nitrogen and phosphorus in high amounts cause excess plant or algae growth, which can reduce levels of dissolved oxygen. Fish struggle to breathe, and that can weaken their resistance to disease or bacteria.

The land along all three rivers affected by the fish kills is primarily agricultural. With more than 900 farms in the valley, the poultry industry dominates. High-nutrient waste from the farms is used as fertilizer and can wash into the river.

It is clear that better, more effective ways to control the nitrogen content of waste water are needed.

It is known, that the control of feed chemicals used in the processing of liquids (e.g., waste water in a waste water treatment system) can be automated through the use of computerized control devices. Problems can occur during the automatic dosing of chemicals into the treatment system because of inaccuracies of measurements of a chemical present in the system and the variable ratio of chemical to liquid when the liquid flow rate is variable.

In the past, dosing was done by laboratory or bench testing the influent chemical concentration, in combination with influent flow rate measurements. Subsequently, dose calculations were performed and the dosing device, a chemical feed pump, for example, was manually adjusted according to the calculations. More recently, partial pacing of the dosing pumps was practiced using an influent water flow signal. Varying the dose rate to maintain a desired effluent chemical concentration test result was deemed a more direct approach.

In recent years, reliable automatic analyzers for chemical concentration have become available, thus enabling automation of the entire dosing procedure. Automatic analyzers can also be set up to detect several important chemicals in waste water treatment system, enabling the use of a variety of chemicals depending on the specific application, e.g., the addition of sodium bicarbonate into an aerated biological reactor or the addition of iron or aluminum salts before a clarifier to control phosphorus removal.

In U.S. Pat. No. 6,129,104 (the '104 patent), the contents of which are incorporated herein by reference, a method for controlling the addition of liquid treatment chemicals by automatic dose control is provided. In this method, the calculation of the amount of chemical to be dosed into the system combines signals from a liquid flow meter, an influent chemical concentration analyzer, and an effluent chemical concentration analyzer. The signals are directed to a computerized chemical dose controller that analyzes and adjusts the data from the signals and generates an output signal that controls the chemical dosing mechanisms. According to the '104 patent, this method may be used, for example, for denitrification of wastewater using methanol as the feed chemical.

Denitrification comprises the removal of nitrate and nitrite from a waste stream through the use of facultative heterotrophic bacteria. These facultative heterotrophic bacteria, in the presence of a carbon source (e.g., methanol), and in the absence of dissolved oxygen (DO), can strip the oxygen atoms from both nitrate and nitrite moieties, leaving nitrogen gas ($N_2$), which exits the waste stream and enters the atmosphere (air is about eighty percent nitrogen gas), hence "denitrifying" the waste stream. Thus, methanol consumption is dependent on influent nitrate and nitrite as well as influent DO, namely, enough methanol is required to first deplete the influent DO and subsequently to account for stripping all the oxygen atoms associated with nitrate and nitrite.

The '104 patent, however, ignores DO and nitrites and further describes measuring influent and effluent concentrations of nitrates only in order to determine an amount of methanol to be fed into the system for denitrification. However, as discussed above, the measurement of the influent and effluent concentrations of nitrates is insufficient in determining the proper amount of methanol to be fed into the system for denitrification. Stated another way a methanol dosing system that strictly looks at influent and effluent nitrate would not account for methanol demands associated with varying levels of influent nitrite and DO, thus leading to possible overdosing or underdosing of methanol. For example, relying on influent nitrate measurements only can result in overdosing because of a drop in influent DO levels. By the same token, reliance on effluent nitrate measurements can result in underdosing because a low level of measured effluent nitrate misses altogether the fact that a reduction in nitrate levels can simply mean that all the nitrate has been converted to nitrite, which must still be reduced. That is, nitrate is first converted to nitrite (thus leading to an increase in the levels of nitrite) on the way to complete conversion to gaseous nitrogen. Instead, the '104 patent relies on "fudge" factors, for instance, the use of an "adjustable factor [which] is determined by the operator" and/or the use of a "sensitivity factor [which] is selected by the operator" to compensate for the inaccuracy inherent in limiting measurements to nitrate concentrations. Initially these operator-controlled "factors" are no more than educated guesses and, at best, might be derived empirically. Implicit in such an operator-controlled technique is the necessity for an operator to "get up to speed" on system requirements, all of which represents a time consuming "learning curve."

Therefore, there is a need for a more accurate, automated method of determining an amount of feed chemical (e.g., methanol) to be fed into a denitrification system without reliance on operator-controlled adjustable or sensitivity factors. In particular, there is a need for a method that takes influent concentrations of nitrogen-containing substances, in addition to nitrates (e.g., nitrites) (so called $NO_x$), and dissolved oxygen and effluent concentrations of these nitrogen-containing substances (i.e., $NO_x$) into account in calculating the proper dose of feed chemical. These measurements can be taken either from influent samples only or from both influent and effluent samples.

SUMMARY OF INVENTION

In one aspect, the invention provides an aqueous denitrification process for a wastewater treatment system. The wastewater treatment system has influent and effluent aqueous flows, a filtration bed harboring microbes, and feed forward and optional feed back control loops. The process comprises the steps of: a) determining influent flow (optionally expressed in millions of gallons per day), Q, influent dissolved oxygen concentration (optionally expressed in mg/liter), $DO_{in}$, influent nitrate concentration (optionally expressed in mg/liter), $NO_3$—$N_{in}$, and influent nitrite concentration (optionally expressed in mg/liter), $NO_2$—$N_{in}$; b) utilizing a feed forward control loop relationship (1) to determine a feed chemical requirement, FCR, $$FCR = Q[(X*DO) + (Y*NO_3-N_{in}) + (Z*NO_2-N_{in})] \quad (1)$$

in which X, Y, and Z are predetermined unitless factors ranging from about 0.7 to about 3.0; c) optionally determining effluent nitrate concentration (optionally expressed in mg/liter), $NO_3$—$N_{eff}$, and effluent nitrite concentration (optionally expressed in mg/liter), $NO_2$—$N_{eff}$; and d) optionally utilizing feed back control loop relationships (2), (3) and (4) to determine an adjusted feed chemical requirement, AFCR, utilizing relationship (5), $$AP = GAIN * ERR \quad (2)$$

$$AI_{(new)} = AI_{(old)} + GAIN * \frac{dl}{TI} * \frac{ERR_{(new)} + ERR_{(old)}}{2} \quad (3)$$

$$A = AP + AI \quad (4)$$

$$AFCR = FCR * (1 + A) \quad (5)$$

in which GAIN is a predetermined unitless action coefficient, ERR is the difference between measured $NO_x$—$N_{eff}$ (which is the sum of $NO_3$—$N_{eff}$ and $NO_2$—$N_{eff}$) and set point $NO_x$—$N_{eff}$, dl is the sum of the microprocessor processing time (optionally expressed in seconds) and a time interval, TI (optionally expressed in seconds), between measurements, and references to new and old refer to a current measurement and a prior measurement. The value of FCR may be expressed in pounds per day by multiplying the value for FCR obtained via relationship (1) by a conversion factor, which is 8.34. The values for X, Y and Z are determined by the stoichiometric equation for the consumption of dissolved oxygen, nitrates and nitrites in the presence of methanol. A more detailed discussion of preferred embodiments is presented, below. However, in one embodiment of the invention, the value of X may be set, for example, at 0.81, the value of Y may be set, for example, at 2.25, and the value of Z may be set, for example, at 1.35. The value of GAIN may be set, for example, at 0.2. The value of TI may be set, for example, at 400 seconds. The value of set point $NO_x$—$N_{eff}$ may fall within the range of 0.25 mg/liter to 10.0 mg/liter. The quotient dl/TI may be approximately equal to 1. The values for $AI_{(old)}$ and $ERR_{(old)}$ may be set at the initial measurement to 0. It should be emphasized, however, that the invention is not limited to or by the equations provided above, which simply serve as illustrative of a preferred embodiment of the invention.

In another aspect of the invention, a wastewater denitrification system is provided. The system comprises an influent flow meter for measuring an influent flow (optionally expressed in millions of gallons per day), Q; an influent concentration analyzer for measuring an influent dissolved oxygen concentration (optionally expressed in mg/liter), $DO_{in}$, an influent nitrate concentration (optionally expressed in mg/liter), $NO_3$—$N_{in}$, and an influent nitrite concentration (optionally expressed in mg/liter), $NO_2$—$N_{in}$; an optional effluent concentration analyzer for measuring an effluent nitrate concentration (optionally expressed in mg/liter), $NO_3$—$N_{eff}$, and an effluent nitrite concentration (optionally expressed in mg/liter), $NO_2$—$N_{eff}$; and a feed chemical controller for providing a feed chemical at a controlled rate. The feed chemical controller is responsive to one or more output signals provided by an automated control loop that accepts input signals from the influent concentration analyzer and optionally the effluent concentration analyzer. The input signals relate to at least $NO_3$—$N_{in}$ and $NO_2$—$N_{in}$ and, optionally, $NO_3$—$N_{eff}$ and $NO_2$—$N_{eff}$. The automated control loop may also accept input signals relating to $DO_{in}$. The automated control loop may also accept input signals relating to Q. The feed chemical may be provided as part of the influent flow. The feed chemical may include any source of carbon, including but not limited to acetic acid, sugars, methanol, ethanol, and the like. The automated control loop may be configured to accept input signals at a predetermined time interval, TI.

In yet another aspect of the invention, a method of automatically controlling a rate at which a feed chemical is provided to microbes harbored in a filtration bed is provided. The method comprises the steps of: (i) determining an influent flow rate (optionally expressed in millions of gallons per day), Q, an influent dissolved oxygen concentration (optionally expressed in mg/liter), $DO_{in}$, an influent nitrate concentration (optionally expressed in mg/liter), $NO_3$—$N_{in}$, and an influent nitrite concentration (optionally expressed in mg/liter), $NO_2$—$N_{in}$; (ii) determining a feed chemical requirement, FCR, based in part on the values for Q, $DO_{in}$, $NO_3$—$N_{in}$, and $NO_2$—$N_{in}$, obtained from step (i); (iii) optionally determining an effluent nitrate concentration (optionally expressed in mg/liter), $NO_3$—$N_{eff}$, and an effluent nitrite concentration (optionally expressed in mg/liter), $NO_2$—$N_{eff}$; (iv) optionally determining an adjusted feed chemical requirement, AFCR, based in part on the values for $NO_3$—$N_{eff}$ and $NO_2$—$N_{eff}$, obtained from step (iii) (that is, $NO_x$—$N_{eff}$), and ERR, which is the difference between measured $NO_x$—$N_{eff}$ (which, in turn, is the sum of $NO_3$—$N_{eff}$ and $NO_2$—$N_{eff}$) and set point $NO_x$—$N_{eff}$; and (v) repeating steps (i), (ii), (iii), and (iv) at a predetermined time interval, TI.

BRIEF DESCRIPTION OF THE DRAWINGS

FIG. 3 is a color/shaded plot of the diurnal variations found for influent concentrations of influent nitrate, influent phosphate and influent dissolved oxygen.

DETAILED DESCRIPTION OF THE INVENTION

The present invention is directed to a system and method for performing denitrification of a liquid flow, typically wastewater. Unlike conventional denitrification systems, which rely exclusively on the measurement of influent and effluent concentrations of nitrates to assist in a calculation of a dosage of a feed chemical, typically methanol, and requires an experienced operator to determine "adjustable" and "sensitivity" factors to "fudge" feed chemical dosage values, the present invention also includes the advantages of measuring influent and effluent concentrations of nitrites, as well as the influent concentration of dissolved oxygen, in order to determine a more accurate dosage of methanol to be used in the wastewater treatment process. Hence, no operator-controlled factors are required, as discussed further herein. The invention also encompasses a system in which effluent measurements are merely optional, thus reducing system complexity and cost.

Figure 1:
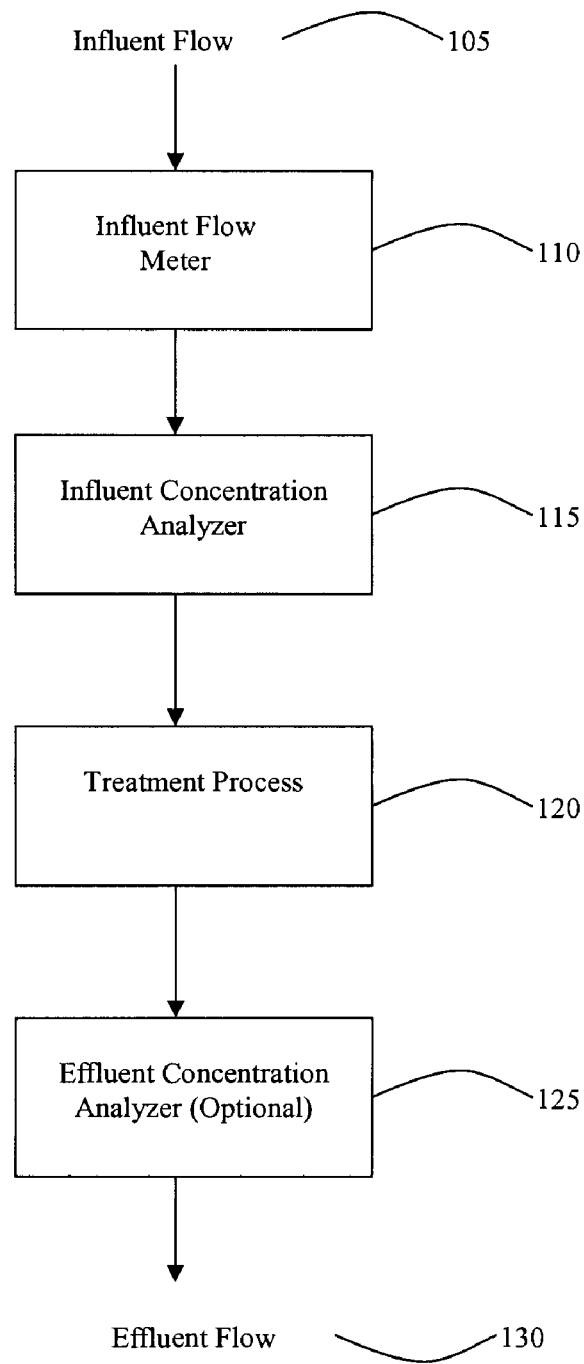
FIG. 1 is a block diagram of a denitrification system according to a preferred embodiment of the invention.

Referring to FIG. 1, a block diagram of a denitrification system 100 according to a preferred embodiment of the invention is shown. The system 100 accepts an influent flow 105 of a liquid to be treated, typically wastewater. The influent flow 105 first encounters an influent flow meter 110, which measures a flow rate of the liquid, and generates a flow rate signal corresponding to the measurement. The influent flow 105 then continues to an influent concentration analyzer 115. The analyzer 115, which may comprise one or more devices, measures concentrations of nitrates, nitrites, and dissolved oxygen within the influent flow, and generates signals corresponding to each of these influent concentrations. These signals can then be combined, along with the flow rate signal, to provide a control signal. Then, the influent flow 105 continues into the treatment process 120. The treatment process 120 treats the wastewater.

The treatment process 120 may include a filter system. For example, a sand filter system may be used to filter out solid materials from the wastewater. In one preferred embodiment, one or multiple continuous backwash upflow sand filter systems may be used within the treatment process 120. See, U.S. Pat. Nos. 4,126,546, 4,197,201, and 4,246,102 for examples of suitable sand filtration systems. The disclosures of these patents are incorporated by reference herein.

One aspect of the treatment process 120 is a denitrification of the wastewater. Denitrification is accomplished by providing a feed chemical, typically methanol, to the wastewater. As described, above, microbes harbored in the filtration bed consume the methanol along with the nitrates and nitrites that are present in the wastewater to produce gaseous nitrogen, which then diffuses naturally into the ambient atmosphere. In this manner, a substantial amount of the nitrogen content in the wastewater is eliminated, hence the term "denitrification."

In a preferred embodiment of the invention, methanol is chosen as the feed chemical because of its availability and cost relative to other synthetic feed chemicals. Its presence in the downstream effluent must nevertheless be held to a minimum. Thus the present invention seeks to provide a more accurate determination of the amount of methanol required to accomplish the desired levels of denitrification, yet not provide an excess of methanol, whose presence in the effluent might prove problematic.

It is known that the methanol introduced into the denitrification system first consumes the dissolved oxygen present in the influent, according to the equation: $3O_2 + 2CH_3OH = 2CO_2 + 4H_2O$. Subsequently, reduction of nitrate and nitrite transpires. Each transformation can be described by the following stoichiometric equations: $6NO_3^- + 5CH_3OH = 3N_2 + 5CO_2 + 7H_2O + 6OH^-$ and $2NO_2^- + CH_3OH = N_2 + CO_2 + H_2O + 2OH^-$. The nitrogen gas produced diffuses into the atmosphere. Accordingly, stoichiometric amount of methanol required for complete denitrification is provided by the equation: $CH_3OH = 0.7DO + 2.0NO_3—N + 1.1NO_2—N$, in which methanol, influent dissolved oxygen, influent nitrate and influent nitrite are expressed in mg/L. Actual values for X, Y and Z can be chosen at the outset, but can be changed at a later time if desired. Actual values are likely to be a certain percentage in excess of stoichiometric needs.

After the treatment process 120 is complete, the treated wastewater then encounters an optional effluent concentration analyzer 125. The analyzer 125 optionally measures concentrations of nitrates and nitrites present in the effluent flow 130, which then exits the filtration system. The analyzer 125 can also generate signals that respectively correspond to the effluent nitrate and nitrite concentrations.

A critical aspect of the denitrification system 100 is the determination of the amount of the methanol dosage to be fed into the treatment process 120. In order to optimize system efficiency, the calculated amount should be as accurate as possible. The present invention provides an improved accuracy by measuring multiple analytes, which provide a more complete picture of the amount of feed chemical required.

Figure 2:
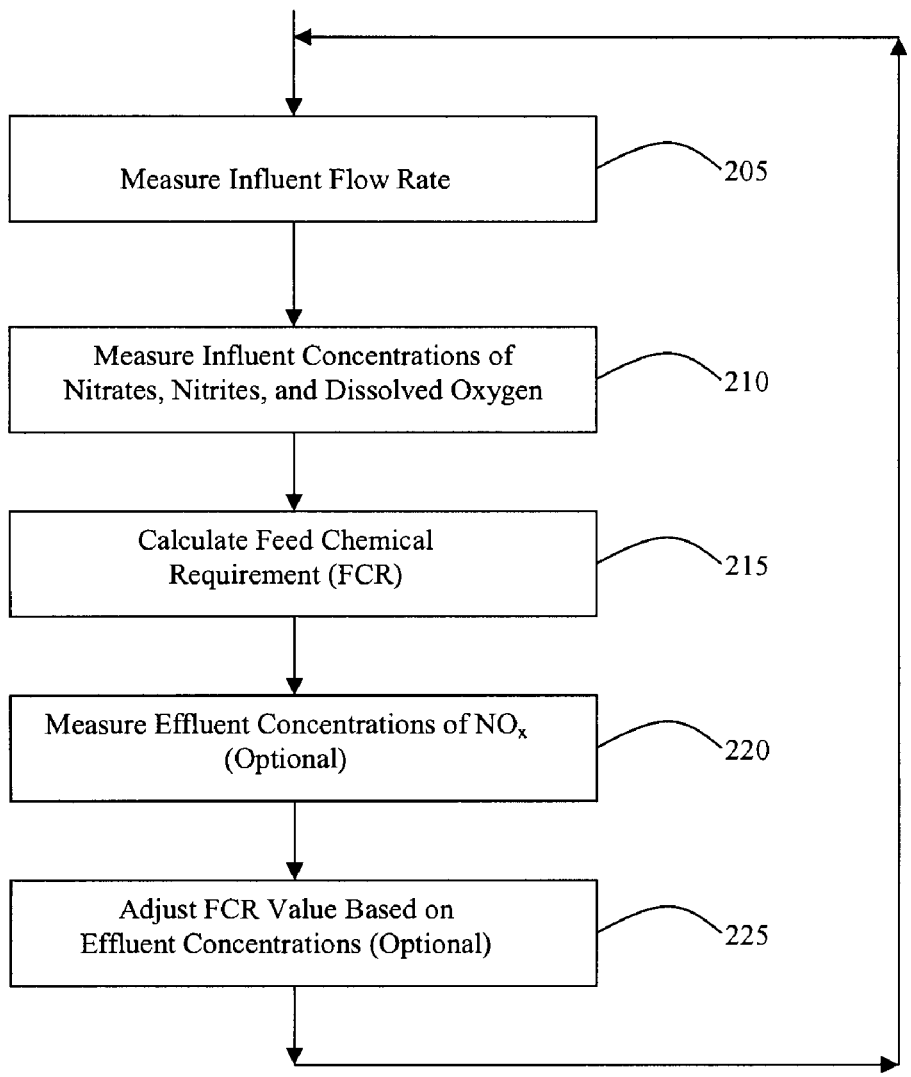
FIG. 2 is a flow chart that illustrates a method for calculating a dosage of methanol to be provided to a denitrification system according to a preferred embodiment of the invention.

Referring to FIG. 2, a flow chart 200 illustrates a methodology for calculating an amount of methanol to be fed into the treatment process 120. First, at step 205, the influent flow rate is measured using the influent flow meter 110. A flow rate signal is generated from this first measurement, and may be represented by the variable Q, and typically expressed in millions of gallons per day. In the second step 210, measurements are taken for the influent concentrations of nitrates, nitrites, and dissolved oxygen, and corresponding signals are generated. These signals are typically expressed in units of milligrams per liter (mg/L), and may be represented by the following variables: Influent concentration of dissolved oxygen=$DO_{in}$; influent concentration of nitrates=$NO_3—N_{in}$; and influent concentration of nitrites=$NO_2—N_{in}$.

Then, at step 215, the generated signals are used to calculate a nominal value of the feed chemical requirement (FCR) according to Equation 1 below:

$$FCR = Q[(X^*DO_{in}) + (Y^*NO_3—N_{in}) + (Z^*NO_2—N_{in})] \quad (1)$$

where X, Y, and Z are predetermined unitless factors that typically fall within the range of 0.7 to 3.0. As discussed above, the stoichiometric amount of methanol needed for complete denitrification requires that X=0.7, Y=2.0 and Z=1.1. These are the minimum values. However, one typically requires an excess of methanol to drive the stoichiometric reaction to completion. Hence, an excess of methanol, up to 50% in excess of stoichiometric requirements, may be desired. Typically, a 10-30% percent excess might be desired, preferably 15-20% excess. In one embodiment of the invention, therefore, X=0.9, Y=2.5 and Z=1.5. In yet another embodiment of the invention X=0.8, Y=2.3, and Z=1.4. The value of FCR may be converted to units of pounds per day by multiplying the initial value by the conversion factor, 8.34.

At step 220, optional measurements are taken from the effluent flow of the concentrations of nitrates and nitrites. Once again, signals are generated that correspond to these measurements. These signals may be represented by the following variables: Effluent concentration of nitrates=$NO_3—N_{eff}$; and effluent concentration of nitrites=$NO_2—N_{eff}$; and total effluent concentration of nitrates and nitrites=$NO_3—N_{eff} + NO_2—N_{eff} = NO_x—N_{eff}$. These signals (namely, $NO_x—N_{eff}$) are then used to calculate an optional adjustment to the nominal FCR value at step 225. The entire method according to the flow chart 200 is then repeated continuously so that the methanol value is continuously updated in conjunction with the continuous influent flow.

In a preferred embodiment of the invention, the adjustment to the FCR value is determined through the use of an optional feedback process that uses a proportional-integral (PI) loop. The adjustment A includes a proportional component AP and an integral component AI; hence, A=AP+AI. The proportional component AP is defined by Equation 2 below:

$$AP = GAIN * ERR \quad (2)$$

where GAIN=the desired magnitude of reaction as a function of the perceived error, and ERR=system deviation=the difference between the effluent set point and the process value. The effluent set point is the expected value of the total effluent concentration of nitrates and nitrites, and the process value is the actual, measured total value of the effluent concentration of nitrates and nitrites. Typically, the effluent set point falls within a range of 0.25 mg/L to 10.0 mg/L. So, for example, if at a given time, the effluent set point is 0.5 mg/L, the actual measured effluent concentration of nitrates is 0.5 mg/L, and the actual measured effluent concentration of nitrites is 0.4 mg/L, then the total effluent concentration of nitrates and nitrites is 0.5 mg/L+0.4 mg/L=0.9 mg/L, and thus ERR=0.9 mg/L−0.5 mg/L=0.4 mg/L. A typical value for GAIN could be 0.2. Thus, in this example, AP=0.2*0.4=0.08.

The integral component of the adjustment, AI, is defined according to Equation 3 below:

$$AI_{(new)} = AI_{(old)} + GAIN * \frac{dl}{TI} * \frac{ERR_{(new)} + ERR_{(old)}}{2} \quad (3)$$

TI=Time Interval, or Reset Time=a predetermined time interval between successive measurements. For example, TI may be set equal to 400 seconds. dl=Current Scan Time=an internal system function that tracks the time required to perform the function from the moment the system receives all of the process variables. The Current Scan Time dl is a sum of TI and the actual computation time, which is typically on the order of milliseconds, for example, approximately 20 ms. Thus, in this example, dl=400 s+20 ms=400.020 s. Therefore, the quotient dl/TI generally is approximately equal to 1, but it is always slightly greater than 1, never exactly equal to 1. The subscripts "new" and "old" refer to the present and previous calculations, respectively. Thus, if a value of the integral component AI is being calculated at present, i.e., $AI_{(new)}$, then $AI_{(old)}$ refers to the value of AI that was calculated 400 seconds ago.

Initial values of $AI_{(old)}$ and $ERR_{(old)}$ are generally set to zero. So, if all example values above are inserted into Equation 3, the following result is obtained: $AI_{(new)}$=0+0.2*(400.020/400)*[(0.5)*(0.4 mg/L+0)]=0.040002 mg/L=approximately 0.04 mg/L. Thus, the total adjustment A=AP+AI=0.08+0.04=0.12.

The total adjustment value A may be limited in order to ensure that adjustments do not exceed a predetermined maximum adjustment. For example, if a particular measurement deviates significantly from the trend of previous measurements, it could be deemed an outlier or an erroneous measurement. Limiting the maximum amount of any given adjustment accounts for such an outlier. In step 225, utilizing equation 5, AFCR is calculated to be AFCR=FCR*(1+0.12) or a 12% increase over FCR.

Turning now to FIG. 3, the reader's attention is directed to a very surprising, unexpected result of measuring influent nitrates (red/gray blocks), influent phosphates (navy/black diamonds) and influent dissolved oxygen (light blue/light gray blocks) over a twenty-four hour period. As shown in the figure, the concentration (in mg/L) of influent nitrate decreases from an average initial value of about 5.0 mg/L to low average midday value of about 4.0 mg/L before rising again a few hours prior to midnight to a high average value of about 5.5 mg/L. Quite unexpectedly, influent dissolved oxygen steadily rises to reach a peak midday value of about 2.7 mg/L before falling off sharply over the next five hours. Thus the concentrations of influent nitrates and influent dissolved oxygen traveled in opposite directions. An operator measuring the concentration of only influent nitrates, even by resorting to "adjustable" or "sensitivity" factors, could not have accounted for an unexpected rise in influent dissolved oxygen and, thus, would have more than likely underestimated the proper amount of methanol required to achieve the desired level of denitrification.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An aqueous denitrification process for a wastewater treatment system having influent and effluent aqueous flows and a filtration bed harboring microbes, the process comprising:
    determining an influent dissolved oxygen concentration, an influent nitrate concentration, an influent nitrite concentration, and an effluent nitrite concentration of wastewater;
    utilizing the dissolved oxygen concentration, the influent nitrate concentration, and the influent nitrite concentration to determine a feed chemical requirement;
    utilizing the feed chemical requirement and the effluent nitrite concentration to determine an adjusted feed chemical requirement; and
    providing a feed chemical to the wastewater based on the adjusted feed chemical requirement.

2. An aqueous denitrification process for a wastewater treatment system having influent and effluent aqueous flows and a filtration bed harboring microbes, the process comprising:
    determining an influent dissolved oxygen concentration, an influent nitrate concentration, and an influent nitrite concentration of wastewater;
    utilizing the dissolved oxygen concentration, the influent nitrate concentration, and the influent nitrite concentration to determine a feed chemical requirement; and
    providing a feed chemical to the wastewater based on the feed chemical requirement,
    in which the feed chemical requirement is determined utilizing a feed forward control loop relationship, FCR=Q [(X*$DO_{in}$)+(Y*$NO_3$—$N_{in}$)+(Z*$NO_2$—$N_{in}$)], and
    in which FCR is the feed chemical requirement, $DO_{in}$ is the influent dissolved oxygen concentration, $NO_3$—$N_{in}$ is the influent nitrate concentration, $NO_2$—$N_{in}$ is the influent nitrite concentration, and X, Y, and Z are predetermined unitless factors ranging from about 0.7 to about 3.0.

3. The aqueous denitrification process of claim 2, in which values of X, Y and Z are set to stoichiometric values.

4. The aqueous denitrification process of claim 2, in which values of X, Y and Z are set 15% above stoichiometric values.

5. The aqueous denitrification process of claim 2, in which values of X, Y and Z are set 30% above stoichiometric values.

6. The aqueous denitrification process of claim 2, further comprising:
   determining an effluent nitrate concentration and an effluent nitrite concentration of the waste water;
   utilizing the effluent nitrate concentration and the effluent nitrite concentration to determine an adjusted feed chemical requirement; and
   providing the feed chemical to the wastewater based on the adjusted feed chemical requirement.

7. The aqueous denitrification process of claim 6, in which the adjusted feed chemical requirement is determined utilizing the following relationships, $$AP = GAIN * ERR$$
$$AI_{(new)} = AI_{(old)} + GAIN * \frac{dl}{TI} * \frac{ERR_{(new)} + ERR_{(old)}}{2}$$
$$A = AP + AI$$
$$AFCR = FCR * (1 + A)$$

in which FCR is the feed chemical requirement, AFCR is the adjusted feed chemical requirement, GAIN is a predetermined unitless action coefficient, ERR is a difference between measured $NO_x$—$N_{eff}$ and set point $NO_x$—$N_{eff}$, in which the measured $NO_x$—$N_{eff}$ is a sum of the effluent nitrate concentration and effluent nitrite concentration, dl is a sum of microprocessor processing time and a time interval TI between measurements, and references to new and old refer to a current measurement and a prior measurement.

8. The aqueous denitrification process of claim 7, in which GAIN is set at 0.2.

9. The aqueous denitrification process of claim 7, in which TI is set at 400 seconds.

10. The aqueous denitrification process of claim 7, in which the set point $NO_x$—$N_{eff}$ falls within a range of 0.25 mg/liter to 10.0 mg/liter.

11. The aqueous denitrification process of claim 7, in which dl/TI is approximately equal to 1.

12. A method of automatically controlling a rate at which a feed chemical is provided to microbes harbored in a filtration bed comprising:
   (i) determining an influent dissolved oxygen concentration, an influent nitrate concentration, an influent nitrite concentration, and an effluent nitrite concentration;
   (ii) determining a feed chemical requirement based in part on values for the influent dissolved oxygen concentration, the influent nitrate concentration, and the influent nitrite concentration, obtained from step (i);
   (iii) determining an adjusted feed chemical requirement based in part on the values of the feed chemical requirement and the effluent nitrite concentration; and
   repeating steps (i), and (ii), and (iii) at a predetermined time interval.

13. The method of claim 12, further comprising:
   determining an effluent nitrate concentration before step (iii);
   in which determining the adjusted feed chemical requirement in step (iii) is based in part on values for the effluent nitrate concentration and the effluent nitrite concentration.

14. A method of automatically controlling a rate at which a feed chemical is provided to microbes harbored in a filtration bed comprising:
   (i) determining an influent dissolved oxygen concentration, an influent nitrate concentration, and an influent nitrite concentration;
   (ii) determining a feed chemical requirement based in part on the values for the influent dissolved oxygen concentration, the influent nitrate concentration, and the influent nitrite concentration, obtained from step (i); and
   repeating steps (i) and (ii) at a predetermined time interval,
   in which the feed chemical requirement is determined utilizing a feed forward control loop relationship, $FCR=Q[(X*DO_{in})+(Y*NO_3—N_{in})+(Z*NO_2—N_{in})]$, and
   in which FCR is the feed chemical requirement, $DO_{in}$ is the influent dissolved oxygen concentration, $NO_3$—$N_{in}$ is the influent nitrate concentration, $NO_2$—$N_{in}$ is the influent nitrite concentration, and X, Y, and Z are predetermined unitless factors ranging from about 0.7 to about 3.0.

15. The method of claim 14, in which values of X, Y and Z are set to stoichiometric values.

16. The method of claim 14, in which values of X, Y and Z are set 15% above stoichiometric values.

17. The method of claim 14, in which values of X, Y and Z are set 30% above stoichiometric values.

18. The method of claim 13, in which the adjusted feed chemical requirement is determined utilizing the following relationships, $$AP = GAIN * ERR$$
$$AI_{(new)} = AI_{(old)} + GAIN * \frac{dl}{TI} * \frac{ERR_{(new)} + ERR_{(old)}}{2}$$
$$A = AP + AI$$
$$AFCR = FCR * (1 + A)$$

in which FCR is the feed chemical requirement, AFCR is the adjusted feed chemical requirement, GAIN is a predetermined unitless action coefficient, ERR is a difference between measured $NO_x$—$N_{eff}$ and set point $NO_x$—$N_{eff}$, in which the measured $NO_x$—$N_{eff}$ is a sum of the effluent nitrate concentration and effluent nitrite concentration, dl is a sum of microprocessor processing time and a time interval TI between measurements, and references to new and old refer to a current measurement and a prior measurement.

19. The method of claim 18, in which GAIN is set at 0.2.

20. The method of claim 18, in which TI is set at 400 seconds.

21. The method of claim 18, in which the set point $NO_x$—$N_{eff}$ falls within a range of 0.25 mg/liter to 10.0 mg/liter.

22. The method of claim 18, in which dl/TI is approximately equal to 1.

* * * * *